US009210458B2

(12) United States Patent  
Hill-Jowett (10) Patent No.: US 9,210,458 B2  
(45) Date of Patent: Dec. 8, 2015

(54) RECEIVING AUDIO/VIDEO CONTENT (71) Applicants: Sony Corporation, Minato-ku (JP); Sony Europe Limited, Weybridge (GB)

(72) Inventor: David Hill-Jowett, Basingstoke (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 0 days.

(21) Appl. No.: 14/385,957

(22) PCT Filed: Mar. 25, 2013

(86) PCT No.: PCT/GB2013/050772  
§ 371 (c)(1),  
(2) Date: Sep. 17, 2014

(87) PCT Pub. No.: WO2013/164566  
PCT Pub. Date: Nov. 7, 2013

(65) Prior Publication Data  
US 2015/0058878 A1    Feb. 26, 2015

(30) Foreign Application Priority Data

May 4, 2012   (GB) .................................. 1207854.9

(51) Int. Cl.  
*H04N 7/167* (2011.01)  
*H04N 21/418* (2011.01)  
(Continued)

(52) U.S. Cl.  
CPC ....... *H04N 21/4181* (2013.01); *H04N 21/4367* (2013.01); *H04N 21/4622* (2013.01);  
(Continued)

(58) Field of Classification Search  
USPC .............................. 725/31, 95, 100, 110, 131  
See application file for complete search history.

(56) References Cited

U.S. PATENT DOCUMENTS 5,020,129 A     5/1991   Martin et al.  
2007/0261078 A1   11/2007   Hwang  
(Continued)

FOREIGN PATENT DOCUMENTS

CN   102118647      7/2011  
EP   1 841 105 A2   10/2007  
EP   2 219 370 A1    8/2010

OTHER PUBLICATIONS

"CI Plus Specification. Content Security Extensions to the Common Interface" v1.3.1(Sep. 2011), 312 pages.*

(Continued)

*Primary Examiner* — Mulugeta Mengesha  
(74) *Attorney, Agent, or Firm* — Oblon, McClelland, Maier & Neustadt, L.L.P.

(57) ABSTRACT

An audio/video content receiver configured to receive media content by a broadcast data path, the media content includes a host module having a tuner configured to assign logical channel indices to media channels to allow selection, at the host module, of the media channels for reproduction by selecting the corresponding logical channel index, the host module storing channel association data associating the logical channel indices with the received media channels. A removable conditional access module (CAM) includes an access controller decoding access-controlled encoded broadcast content, the host module and the removable CAM to provide an encrypted communication link for decoded access-controlled encoded broadcast content between the CAM and the host module. The host module includes a detector configured to detect a conflict of logical channel index between the channel association data acquired by the host from the broadcast data path and the channel association data provided by the CAM.

20 Claims, 5 Drawing Sheets (51) Int. Cl.
  *H04N 21/4367* (2011.01)
  *H04N 21/462* (2011.01)
  *H04N 21/482* (2011.01)
  *H04N 21/434* (2011.01)

(52) U.S. Cl.
  CPC ......... *H04N21/482* (2013.01); *H04N 21/4823* (2013.01); *H04N 21/4825* (2013.01); *H04N 21/4345* (2013.01)

(56) References Cited

U.S. PATENT DOCUMENTS

| | | | |
|---|---|---|---|
| 2010/0023963 | A1 | 1/2010 | Crookes et al. |
| 2010/0186043 | A1* | 7/2010 | Yuki et al. ........................ 725/50 |
| 2010/0205645 | A1 | 8/2010 | Tokoshima et al. |
| 2011/0058633 | A1 | 3/2011 | Kim |
| 2012/0254618 | A1 | 10/2012 | Moore |
| 2013/0177154 | A1 | 7/2013 | Hill-Jowett |
| 2014/0013115 | A1 | 1/2014 | Hill-Jowett |

OTHER PUBLICATIONS

U.S. Appl. No. 14/384,925, filed Sep. 12, 2014, Gutta et al.
U.S. Appl. No. 14/376,007, filed Jul. 31, 2014, Hill-Jowett.
International Search Report issued Aug. 19, 2013, in PCT/GB13/050772 filed Mar. 25, 2013.
"Cl Plus Specification. Content Security Extensions to the Common Interface.", Cl Plus Specification, Technical Specification, XP-002706380, v1.3 (Jan. 2011), 10 pages.
Jiang, et al., Secure Communication between Set-top Box and Smart Card in DTV Broadcasting, IEEE Transactions on Consumer Electronics, XP001225096, vol. 50, No. 3, Aug. 2004, pp. 882-886.

* cited by examiner

RECEIVING AUDIO/VIDEO CONTENT

CROSS REFERENCE TO RELATED APPLICATION

The present application claims the benefit of the earlier filing date of GB1207854.9 filed in the United Kingdom Intellectual Property Office on 4 May 2012, the entire content of which application is incorporated herein by reference.

BACKGROUND

1. Field of the Disclosure

This disclosure relates to receiving audio/video content.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

As background technology, the DVB Common Interface ("CI") specification allowed a television receiver or set top box (a "host") to interact with a secure hardware module (a conditional access module or "CAM") to allow the host to decrypt access-controlled audio/video (audio, video or audio and video) content. The CI specification defines an interface between the host and the CAM, so that the two will work together if both conform to the CI specification. This interoperability provided a significant benefit of the CI system, as, in principle, it allowed consumers a choice of compatible products from different manufacturers.

In the CI specification the CAM interacts with a smart card and/or a user's personal identification number ("PIN") to provide user authentication.

However, a disadvantage of the original CI specification is that it gave the potential for the decrypted digital content to be copied. This problem arises from the way in which the host and CAM interact. In use, the host sends encrypted data to the CAM. The CAM checks the user authentication and, assuming that the user is authenticated, it decrypts the access-controlled content. The CAM then sends the decrypted content back to the host over the CAM-host interface, which is generally a PCMCIA (Personal Computer Memory Card International Association) interface, though it is not limited to this interface—for example, a USB interface could be used. This connection from the CAM to the host represents a security weakness, in that the decrypted digital content can in principle be intercepted and unlawfully copied. This security weakness meant that some content providers preferred integrated devices, which have the host and CAM as a single unit, because this allowed them better security over the transfer of unencrypted data from the CAM to the host. However, this of course acted against the advantage associated with CI, relating to the potential interoperability of different CAMs and hosts.

The CI Plus specification was drafted to address these problems, by two main routes. CI Plus provides a secure interface between the CAM and the host, so that decrypted content data is not sent in clear form between the two devices. Also, CI Plus provides for the authentication of both the host and the CAM, rather than the CI technique of authenticating only the CAM.

The authentication system uses certificate hierarchy so that the host and the CAM must both have been issued certificates by an authority (such as CI Plus LLP).

The PCMCIA interface between a host and a CAM is protected by encrypting the decrypted content data before it is sent from the CAM to the host, and then decrypting it at the host. This encryption is separate to the access control encryption-decryption established by the content provider, and is specific to each particular CAM-host pair. Keys are exchanged between the CAM and host by the Diffie-Hellman key exchange technique. The keys are also cycled from time to time, so that even if a key was compromised, it would in any event be changed a few seconds later.

The CI Plus specification version 1.3 includes a so-called operator profile arrangement. Operator profiles allow the selection of a network information table (NIT) from a choice of different sources. The nature of the NIT will now be described.

The NIT carries network specific information, and may relate to a network encompassing more than one radio frequency (RF) channel, and more than one transport stream (TS). Information carried by the NIT can include radio frequencies or RF channel numbers applicable to that network, and a mapping between logical channel numbers (LCNs) and programme identifiers broadcast by the network. Logical channel numbers relate to the order in which television channels are presented to the user for selection at an individual host (by a channel selector or an electronic programme guide (EPG)) and are generally independent of the actual mechanism by which the television channels are transmitted. For example, in the United Kingdom the broadcast channel BBC1 is assigned to LCN 1 (in a terrestrial system) or 101 (in a satellite system). This assignment is entirely independent of the actual radio frequency by which the channel BBC1 is transmitted, and is also entirely independent of which packet identifiers (PIDs) the BBC1 transport stream is allocated for transmission. The NIT provides a mapping between the LCN and the transmission information such as RF channel or TS. To tune to a particular channel such as BBC1, a receiver may consult the NIT to establish which TS carries BBC1, then tune to the RF frequency carrying that TS, then filter packets from that TS with PID=0 to obtain the programme allocation table (PAT), then (once a channel selection is made) use information from the PAT to filter packets of the programme map table (PMT) to obtain the PIDs of so-called elementary streams corresponding to the desired channel (BBC1), then filter the packets to obtain the required PIDs to allow decoding of those elementary streams.

Previously, the NIT was delivered as part of the broadcast signal. The operator profile arrangement of CI Plus 1.3 allows two choices of delivery of the NIT, and in particular allows the potential delivery of a NIT via the CAM rather than reception as an over the air (OTA) delivery.

There are two operator profile settings in CI Plus 1.3:

profile_type=0: in this mode, the NIT is determined from the broadcast information; and profile_type=1: in this mode, the CAM delivers a NIT to the host, and the host generates a LCN list dependent upon the NIT delivered by the CAM.

The CAM can generate the NIT from various sources. In principle, the NIT may be pre-programmed into the CAM. Or the CAM can receive the NIT as an OTA signal directed to that CAM or to CAMs provided by a particular network. Or the network can convey the NIT to the CAM by the low speed communications (LSC) mechanism provided by the CI Plus specification, using a secure separate connection such as an internet connection. The operator profile setting can also be provided by the CAM based on operator data from any of these sources.

In operation, the host queries the CAM to ask which operator profile is applicable. If the operator profile is type 0, then the host demultiplexes the NIT from the broadcast signal. If the operator profile is type 1, then the CAM provides the NIT to the host.

SUMMARY

This disclosure provides an arrangement as defined in claim 1.

Various further respective aspects and features are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein.

To establish the technical context of the present embodiments, a broadcast system having a tuner and decoder arrangement will first be described with reference to FIGS. 1 to 3.

Figure 1:
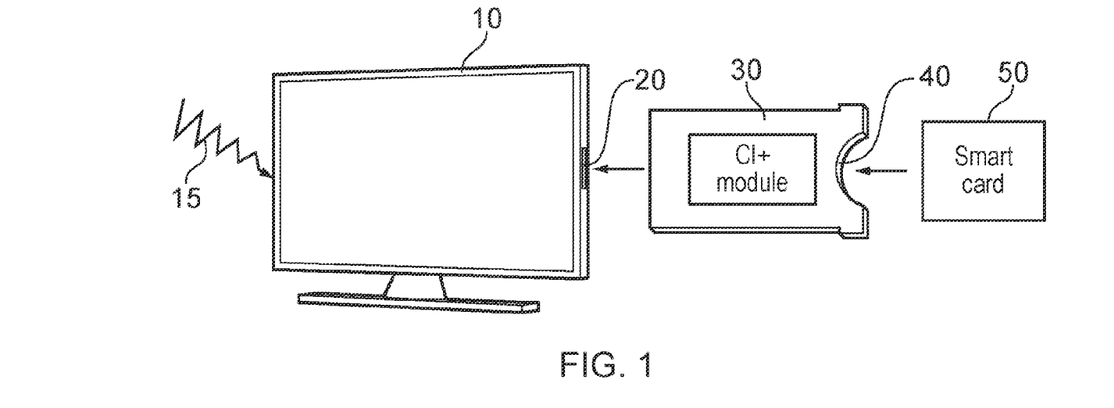
FIG. 1 is a schematic diagram of a host device with a CAM and a smart card.

Referring now to FIG. 1, a host device 10 is shown here as a television set but could be, for example, a set top box (noting that the expression "set top" does not imply, to the skilled person, any requirement for a particular physical position of the device in use). The host device 10 receives an access-controlled television signal 15 via a broadcast data path. This could be, for example, a satellite television signal received by a satellite dish (not shown), a terrestrial television signal, a cable television signal or the like, although other types of television signal include a television signal broadcast or transmitted by an internet protocol (IP) packet signal. One technique is to encode an MPEG transport stream (TS) into IP packets so that an IP packet carries a number (for example 7 or 8) TS packets. Another technique encodes the television signal as a so-called ISO (International Standards Organisation) BMFF (Base Media File Format) arrangement described in the reference: http://en.wikipedia.org/wiki/ISO_base_media_file_format, the contents of which are incorporated into the present description by reference. In such arrangements the IP interface at a host device is generally considered within the art as a "tuner" even though it may have no radio frequency circuitry or functionality. It does however act in a similar way to a radio frequency tuner in that it selects an IP stream from a multitude of possible IP streams. It may also provide buffering of the received IP stream.

The host device 10 has a PCMCIA slot 20 which includes electrical connections and a physical space for a plug-in module, both according to the PCMCIA standard. In other embodiments, a universal serial bus (USB) or other electrical interface can be used instead of the PCMCIA interface.

A CI Plus conditional access module, referred to as a CICAM 30, is a PCMCIA module which can be plugged into the PCMCIA slot 20. When the CICAM 30 is fully plugged into the slot 20, electrical connections are made between connectors on the CICAM 30 and cooperating connectors within the slot 20.

The CICAM itself may be a cardless module or may have a slot 40 into which a so-called smart card 50 may be inserted. The smart card is removable and carries information defining a current user of the content receiver in a tamper-proof, secure and non-volatile form. When the smart card is fully inserted in the slot 40, a data connection is formed between the smart card 50 and the CICAM 30, either by using cooperating electrical connectors on the smart card 50 and within the slot 40, or by using a known contactless connection technique in which data is transferred wirelessly over a very short range such as 1-2 cm.

A data link 68, called a Low Speed Communications (LSC) link, provides data communications between the head end and the CICAM, via the host's IP (Internet Protocol) port—or in other words the internet connection of the host. The LSC link may therefore be provided by, for example, an encrypted internet data link between the host and the head end. The term "Low Speed" refers in a general sense to a comparison between the speed of the LSC and the data rate of the broadcast data path, which would (in the case of a satellite or terrestrial data path) generally be much higher. But no absolute value of speed or data rate is implied. In this way, the CAM and the content source are configured to establish a secure communications link via an internet data connection.

Accordingly the host device and the CICAM cooperate to provide an audio/video content receiver being configured to receive media content from a content source by a broadcast data path, the media content being arranged as a plurality of media channels, the content receiver comprising: a host module (such as the host device 10) having a tuner configured to assign logical channel indices to the media channels to allow selection, at the host module, of one or more of the media channels for reproduction by selecting the corresponding logical channel index, the host module storing channel association data associating the logical channel indices with the received media channels; and a removable conditional access module (CAM) (such as the CICAM 30), the CAM having an access control unit for decoding access-controlled encoded broadcast content, the host module and the removable CAM being arranged to provide an encrypted communication link for decoded access-controlled encoded broadcast content between the CAM and the host module.

Such a receiver may be configured to display a channel selection list to allow user selection of a channel according to the logical channel index associated with that channel.

Figure 2:
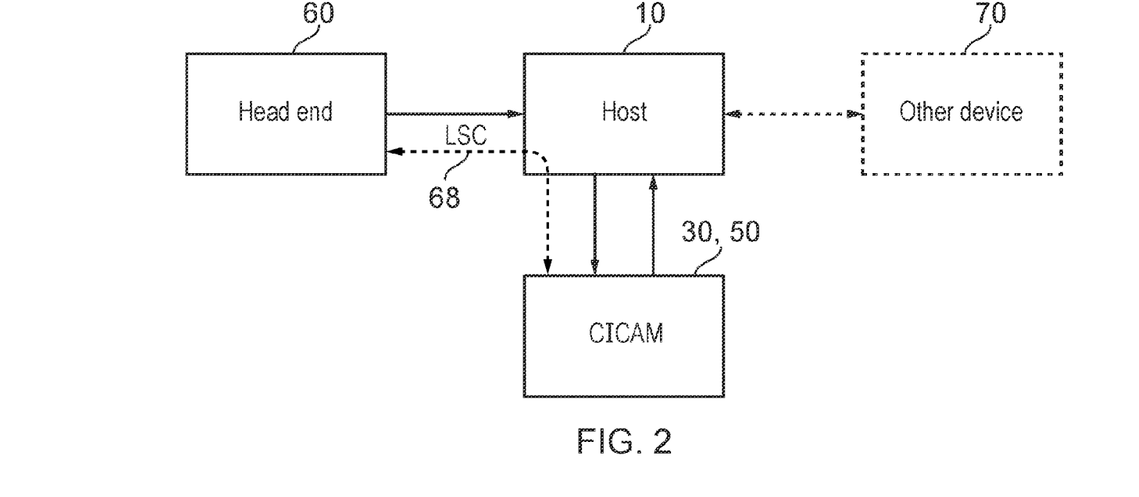
FIG. 2 is a schematic diagram of a conditional access (CA) system incorporating the host device of FIG. 1.

FIG. 2 schematically illustrates the host device 10 in the context of a conditional access system. A so-called head end 60 represents the source of the access-controlled television signal 15. The head end may represent, for example, an uplink station of a satellite broadcaster or a signal distribution centre of a terrestrial or cable broadcaster. The CA system scrambles content at the head end using a CA system encryption. The head end can also introduce other CA-related information into the encrypted data stream which enables the CICAM to descramble the content and to manage the subscriber's (user's) access and entitlements.

The head end 60 sends the television signal 15 to the host 10 which in turn passes the signal to the CICAM 30 for decryption of the access control encryption. The CICAM 30 then re-encrypts the signal using a local encryption and sends the re-encrypted signal back to the host 10 via the PCMCIA connection. The host decrypts the signal received from the CICAM 30 for display on a display screen or for supply to another device 70 such as a hard disk based video recorder.

Figure 3:
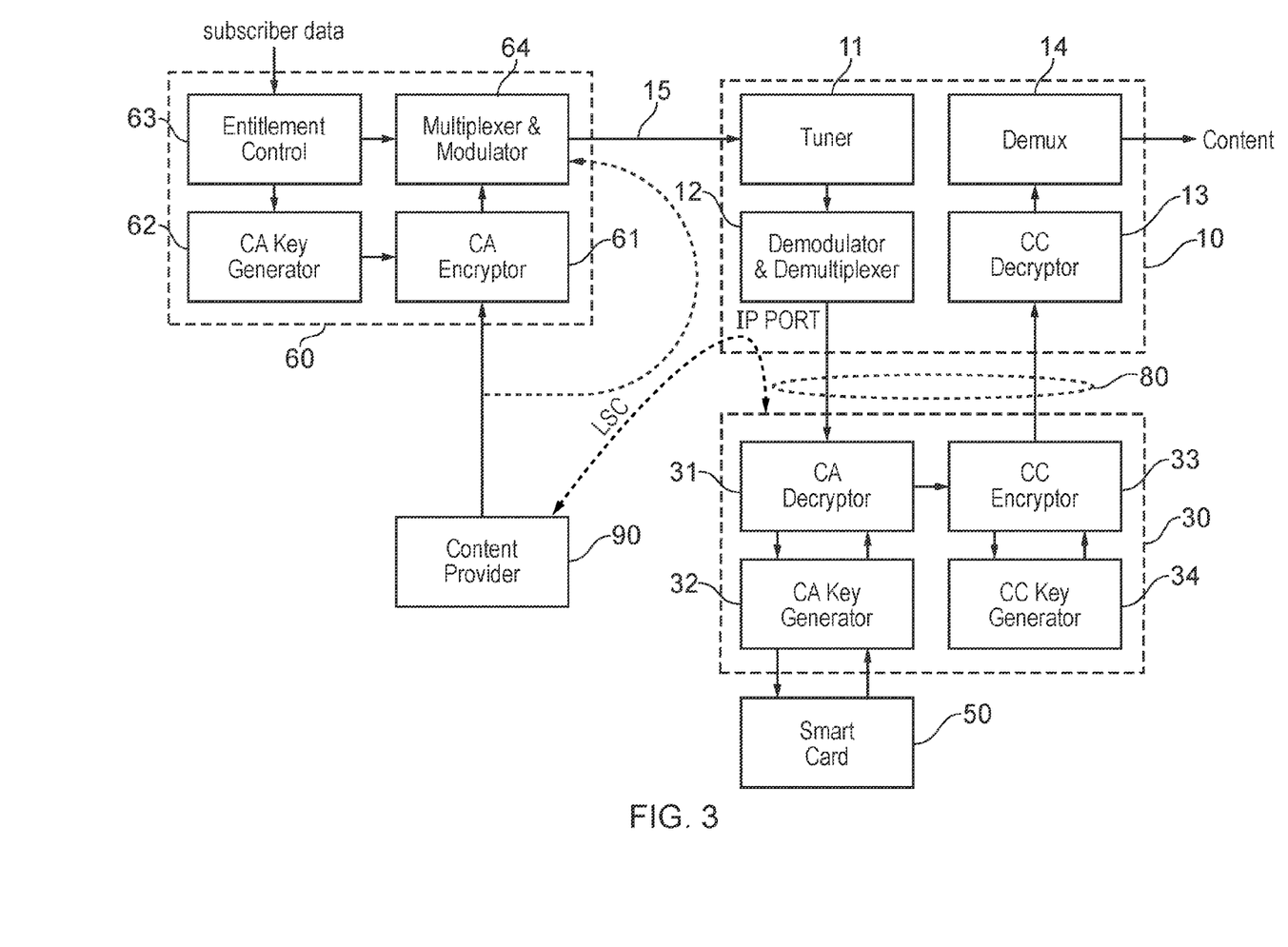
FIG. 3 is a schematic diagram illustrating aspects of the operation of the system of FIG. 2.

FIG. 3 is a schematic diagram illustrating the operation of the system of FIG. 2. The detailed operation of the system of FIG. 3 is described in the CI Plus Specification 1.3 (2010-01), available (at the time of filing) at http://www.ci-plus.com/data/ci-plus_specification_v1.3.pdf. This document is incorporated by reference into the present description. The present description of FIG. 3 simply provides an overview of that detailed operation, for the purposes of placing the subsequent description into the appropriate technical context.

As before, FIG. 3 shows the head end 60 (which receives a content signal from a content provider 90), the host device 10, the CICAM 30 and the smart card 50. The signal 15 is shown passing from the head end 60 to the host device 10. The secure interface 80 between the host device 10 and the CICAM 30 is referred to as the common interface.

Conditional Access

Known CA systems provide techniques by which a user can be denied or allowed access to a digital television stream. Access is provided only to those subscribers or users with valid payment accounts. In practical terms, a user is provided with a smart card 50 identifying that user in (ideally) a tamper-free way, and the system is set up so that only users with valid smart cards are able to obtain access to the access-controlled content.

Access control is provided by the use of scrambling and encryption. The content signal is scrambled with an 8-byte control word, which is changed frequently (up to several times per minute) to avoid the CA system being compromised by outside knowledge of the control word. The control words are transmitted to the receiver's CICAM, for descrambling of the scrambled content, in an encrypted form as an entitlement control message (ECM). The CICAM decrypts the control word to allow descrambling of the access-controlled content only when it is authorised to do so by receipt of an entitlement management message (EMM). EMMs are specific to each user or group of users; the CICAM confirms the rights which an EMM provides by comparing the user identification provided in the EMM with user information provided in the smart card 50. The EMMs can be sent less frequently than the ECMs, with intervals between successive EMMs in current commercial systems varying between 12 minutes and six weeks.

ECMs and EMMs themselves are well known message types in MPEG television distribution systems. The format of their payloads can be specific to the CA system in use, with the differences between formats often being semantic rather than having technical significance.

Head End

The head end 60 comprises a CA encryptor 61, a key generator 62, an entitlement control unit 63 and a multiplexer and modulator 64.

The content provider 90 supplies content (such as television signals) to the head end 60. The head end 60 applies conditional access (CA) scrambling and encryption to the content.

More specifically, the CA encryptor 61 encrypts or scrambles the content using a CA key as a control word. The CA key is generated by the CA key generator 62. The scrambled content generated by the CA encryptor is supplied to the multiplexer and modulator 64.

The CA key is also provided to the entitlement control unit 63, which generates ECMs based on the CA keys and EMMs based on subscriber data defining which subscribers are entitled to descramble which content streams. The ECMs and EMMs are supplied to the multiplexer and modulator 64. One or more scrambled content streams from the CA encryptor 61, one or more unscrambled (open access or "free to air") content streams and the entitlement control messages are multiplexed together to form a transport stream such as an MPEG2 transport stream. Known formats are used to carry the content data, the ECMs and the EMMs. The ECMs, EMMs and data defining the type of scrambling used on each elementary stream (corresponding to individual scrambled content streams) are provided in a known format and are referenced using known techniques in a programme map table (PMT and/or in a conditional access table (CAT) which has a predetermined programme identifier (PID) of 0x001, so that the CAT can be recognised at the CICAM.

The multiplexed transport stream is then modulated by the multiplexer and modulator 64 for transmission as a cable, satellite or terrestrial broadcast signal 15.

Host Device

The host device 10 comprises a tuner 11, a demodulator and demultiplexer 12, a demultiplexer ("demux") 14 and a CC (content control) decryptor 13. Note that the host device may have other additional functions; for example, a host device may provide two or more of satellite broadcast reception, cable broadcast reception, terrestrial broadcast reception and network (IPTV) television reception. Accordingly, the content source may be configured to send data to the host module as one or more of: internet protocol (IP) data, satellite broadcast data, terrestrial television broadcast data and cable broadcast data.

Depending on the type of broadcast signal 15, the tuner acts to transform the received signal back to baseband, so that the demodulator and demultiplexer 12 can select and demultiplex a single elementary content stream and associated CAT data from the received signal. The content stream and ECM/EMM data are passed via the common interface 80 to the CICAM 30.

In the case of access-controlled content data, at this stage the content data is still scrambled as it is passed via the common interface 80 to the CICAM 30. This part of the transmission over the common interface 80 is therefore secure by virtue of the CA encryption.

Assuming the ECM and EMM allow it, the CICAM 30 descrambles the content data and re-encrypts it using a content control (CC) encryption. The way in which this is done will be described below. The CC encrypted data is returned to the host device 10 where it is demultiplexed by the demux 14 and decrypted by the CC decryptor 13, so that it can be displayed or passed to another device 70 as clear content.

The host device therefore operates to receive audio/video content and has a content decoder (the CAM module for example) capable of decoding an audio/video programme from a packetized data stream (such as a TS) by using data packets (such as EMM/ECM) defining decryption information. The received TS may comprise one or more programmes having data packets identified by respective sets of packet identifiers (such as PIDs) and comprising identification data (PAT, PMT, CAT and the like) mapping programmes to respective sets of the PIDs.

The host device is also configured to acquire channel association data via the broadcast data path, or in other words, to receive a broadcast NIT. This feature will be described further below.

CICAM

The CICAM 30 may be a CAM according to the Common Interface plus standard and comprises a CA decryptor 31, a CA key generator 32, a CC encryptor 33 and a CC key generator 34.

The CA decryptor 31 and the CA key generator 32 may be considered as an access control unit for decoding access-controlled broadcast content or other data. The CC key generator 34 and the CC encryptor 33 of the CICAM 30, and the demultiplexer 14 and the CC decryptor 13 of the host device 10 cooperate to provide an encrypted communication link (the common interface 80) for decoded access-controlled encoded broadcast content, between the CICAM and the host device.

The CA decryptor 31 uses keys generated from received ECMs and EMMs by the CA key generator 32, using checks of the user's identity from the smart card 50, to descramble the received access-controlled content. This part of the operation of the CICAM uses known CA techniques to retrieve and apply the CA keys.

Clear content data is passed from the CA decryptor 31 to the CC encryptor 33. However, as this data transfer is entirely internal to the CICAM, it can be rendered secure and tamper proof by known techniques such as by providing the CA decryptor 31, the CC encryptor 33 and the clear content interface within a single integrated circuit device.

The CC encryptor 33 encrypts the descrambled content using a CC key supplied by the CC key generator 34. This key is established by a secure interchange between the CICAM 30 and the host device 10, and is specific to that CICAM-host device pair. The CC-encrypted content is passed over the common interface 80 to the host device 10. Therefore, this part of the common interface is also secure, as the content data is CC-encrypted as it passes to the host device.

Accordingly, the host module and the CAM may be arranged to provide an encrypted communication link for decoded access-controlled encoded broadcast content between the CAM and the host module.

Key Exchange

The CICAM 30 and the host device 10 both contain logic, firmware or software providing algorithms for Diffie-Hellman (DH) secure key exchange, hashing and encryption using the known algorithms SHA-256, DES and AES, respective certificates issued by a certifying authority such as CI Plus LLP, and private keys with the corresponding public keys.

When the CICAM 30 is first associated with the host device 10, the CICAM 30 initiates an authentication process with the host device 10. In this process, each device verifies the other's certificate, and the DH key exchange process takes place so as to securely share keys between the two devices. In particular, the CICAM first requests that the host device provides its certificate data. The CICAM verifies the signature on the host device's certificate. The same process is then carried out by the host requesting and verifying the CICAM's certificate. The CICAM and the host then each demonstrate that they possess the private key corresponding to the public key in the certificate by signing a DH public key and sending it to the other device for validation. The CICAM then obtains and verifies an authentication key AKH from the host. The CICAM and host start to compute and exchange key data for the encryption and authentication of data sent over the common interface 80. In this way, the key, key pair or other key information established by the CICAM and the host for communication over the common interface 80 is specific to that CICAM-host pair.

After authentication, the CICAM also starts to compute the CC key. The CICAM can also instruct the host device to compute the CC key. The CC key is then used as described above to encrypt content data passed from the CICAM 30 to the host device 10, according to the AES algorithm. Therefore, it will be understood that the keys used for the secure common interface 80 are specific to a particular CICAM-host pair.

The host device of FIG. 3 can operate under the control of a central processing unit which in turn may be a programmable processor device operating according to software or firmware stored in a memory (which may in turn be a non-transitory machine-readable memory such as a magnetic or optical disk store or a non-volatile semiconductor memory).

Figure 4:
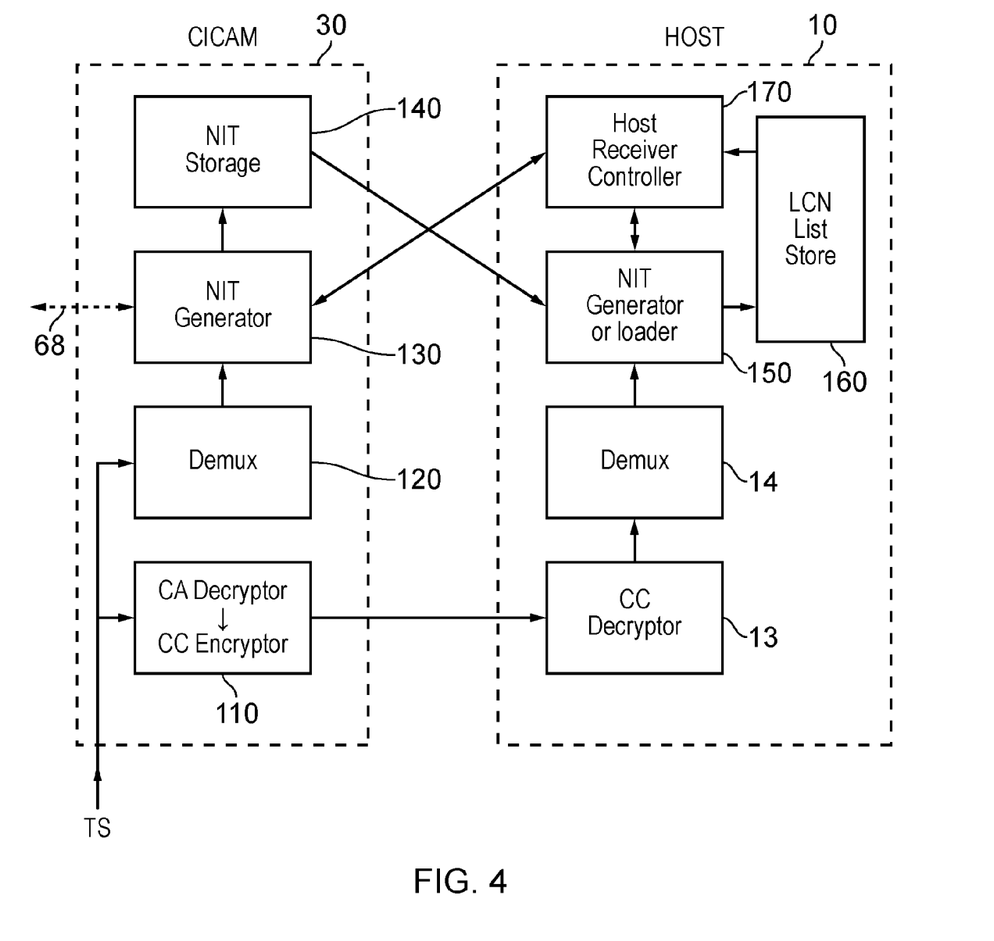
FIG. 4 schematically illustrates the operation of a CA system according to an embodiment.

FIG. 4 schematically illustrates the operation of a CA system according to an embodiment.

In particular, FIG. 4 schematically illustrates aspects of the communication between the CICAM 30 and the host 10. Not all of the features of FIG. 3 are shown in FIG. 4, for clarity of the diagram, but their presence is assumed in the following discussion.

The CICAM 30 receives a transport stream from the tuner 11 and the demodulator and demultiplexer 12 of the host. A box 110 schematically illustrates the process carried out by the CA decryptor 31, the CA key generator 32, the CC key generator 34 and the CC encryptor 33, to carry out network (CA) decryption and CICAM encryption of a desired channel on the received transport stream. In this regard, the function of the items represented by the box 110 is as described with reference to FIG. 3 above. Note that all communications between the CICAM 30 and the host 10 are via the common interface 80. The data path involving the box 110 represents the flow of data during normal (television channel receiving) operation of the system.

In order to detect a NIT, the CICAM 30 employs a demultiplexer 120, a NIT generator 130 and NIT storage 140. The demultiplexer 120 also receives the transport stream and demultiplexer is from it data which is provided by the service operator or another source, such as the broadcast NIT, a service delivery table (SDT), private data and the like. These data are passed to the NIT generator 130. Here, the data are assembled into a NIT which is stored in the NIT storage 140. Other data components may be included within the generated NIT, such as data from the smartcard 50, or data received via the LSC link 68. The NIT which is generated is a quasi-static data structure, which is to say that it does not change very often. It is therefore appropriate to store the generated NIT in the NIT storage 140 for future use.

At the host, the CC decryptor 13 and the demultiplexer 14 receive the CC encrypted programme data from the box 110, decrypts it and demultiplexes it. The demultiplexed programme data is passed to a NIT generator or loader 150. The NIT generator or loader 150 can derive a NIT from the received programme data or can load a NIT from the NIT storage 140 of the CICAM 30.

In a further mode of operation, to be described below, the NIT generator or loader 150 can combine a NIT received from the broadcast signal and a NIT provided by the CICAM 30 to form a composite NIT. This mode of operation will be referred to as profile_type=2.

Based on the received NIT (in profile_type=0), the NIT provided by the CICAM 30 (in profile_type=1) or the composite NIT (in profile_type=2), the NIT generator or loader 150 stores a list of LCNs in a LCN list store 160.

A final component of the host 10 to be described is a host receiver controller 170. The controller 170 controls operations of the host, including those operations represented by functional features illustrated in FIG. 3, and controls interaction with the CICAM 30. In respect of the functionality being described here, the controller 170 communicates with the NIT generator 130 of the CICAM 30 so that the NIT generator 130 may instruct the host to tune to a required radio-frequency channel in order that a transport stream from which a NIT can be derived is available to the CICAM 30. The controller 170 can also query the CICAM to establish the current profile_type and can instruct the NIT generator 132 provide the latest version of the CICAM's NIT to the host.

Once the LCN list store 160 has been populated by the NIT generator or loader 150, the controller 170 can control channel reception operations of the host according to the mapping between transport streams, PIDs and LCNs provided by the data in the LCN list store 160.

Aspects of the operation of the CA system described above will now be discussed with reference to FIGS. 5-7, in which processing operations carried out by the CICAM 30 are represented as a left-hand column as drawn, and processing operations carried out by the host 10 are represented by a right-hand column as drawn.

Figure 5:
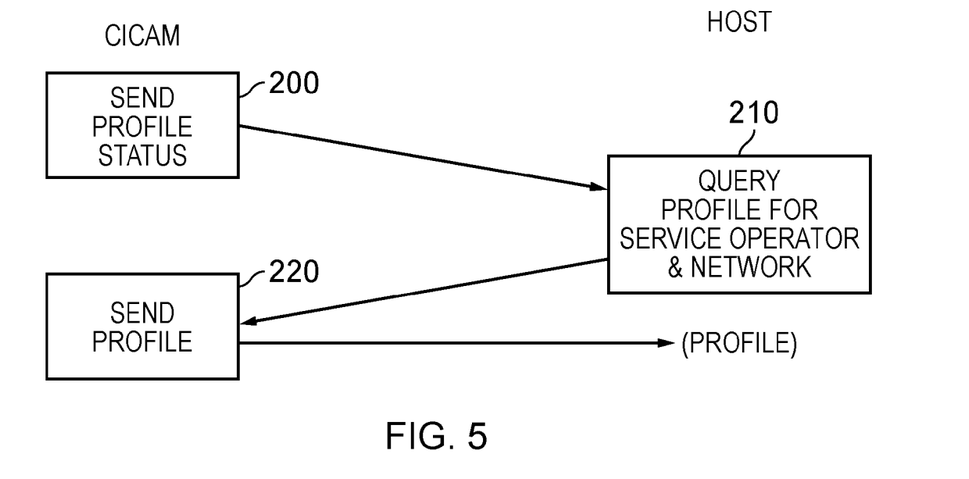
FIG. 5 schematically illustrates a profile query process.

FIG. 5 schematically illustrates a profile query process. At a step 200, the CICAM 30 reports the current profile status to the host on opening a "session", which is to say, upon initialisation of an interaction between the CICAM and the host. The profile status simply indicates whether a profile is established for the current operator and network and whether the CICAM 30 holds a currently valid CICAM NIT in respect of the current operator and network.

At a step 210, the host 10 queries the CICAM 30 to find the actual profile for the current operator and network. The CICAM 30 sends a reply at a step 220. In particular, the step 200 involves the CICAM 30 reporting to the host 10 which of the available values of profile_type is applicable, namely profile_type={0,1,2}, plus any other data which the host may require or request in respect of the current operator and network. If the profile_type=1 or 2 and the CICAM 30 already holds a valid CICAM NIT in respect of the current operator and network, then the CICAM can transmit the CICAM NIT to the host at the step 220.

If the indication at the step 200 was that a valid profile is not currently established, the steps 210 and 220 can be omitted.

Figure 6:
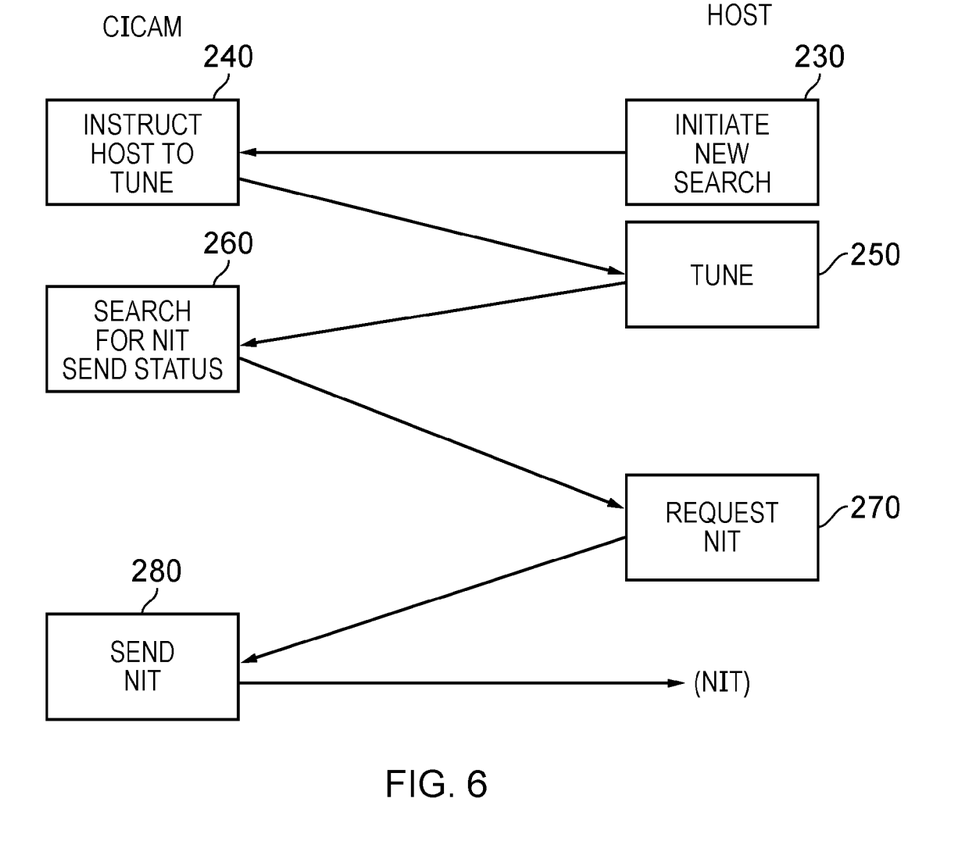
FIG. 6 schematically illustrates a process of a CAM obtaining a NIT.

FIG. 6 schematically illustrates a process of the CICAM obtaining a NIT and passing it to the host (that is, providing further channel association data to the host) with this process taking place when required by the host and in circumstances that the CICAM has indicated, at the step 200, that the CICAM 30 does not hold a currently valid profile for the current operator and network.

In some embodiments, the search for a CICAM NIT is initiated by the host. Such an arrangement is illustrated in FIG. 6, in which, at a step 230, the host initiates a new search by sending an instruction to the CICAM 30 (for example, the controller 170 sends such an instruction to the NIT generator 130). In other embodiments, the step 230 can be omitted and the CICAM 30 can initiate the search process by starting with the step 240 to be described.

At the step 240, the NIT generator 130 of the CICAM 30 instructs the host to tune to a required radio-frequency channel in order that the appropriate transport stream can be received and processed by the CICAM 30 in order to derive the CICAM NIT. This involves the NIT generator 130 sending such an instruction to the controller 170 which in turn (at a step 250) controls the operation of the tuner 11 to tune to the correct radio-frequency channel.

Once the appropriate transport stream is received by the CICAM 30, the NIT generator 130 obtains a CICAM NIT as described above, stores it in the NIT storage 140 and sends a status report (at a step 260) back to the controller 170 to indicate that a CICAM NIT is available.

At a step 270, the controller 170 sends a request to the NIT generator 132 provide the CICAM NIT to the host. In response, at a step 280, the NIT generator 130 causes the CICAM NIT to be read from the NIT storage 140 and provided to the NIT generator or loader 150, which in turn stores data derived from the NIT (such as a schedule of LCNs) in the LCN list store 160.

The process described with reference to FIG. 6 relates to the CICAM obtaining the CICAM NIT from broadcast information. As discussed above, however, this is not the only means by which the CICAM 30 can generate the CICAM NIT. For example, the NIT generator 130 may communicate directly with the content provider 90 using, for example, the LSC link 68. The CICAM 30 may also communicate with the smartcard 50 to acquire information from the smartcard 50. In order to prepare the CICAM NIT, the CICAM may combine any one or more of these sources of information according to a combination algorithm established by the content provider. In embodiments, the CAM may be configured to obtain the CAM's channel association data, at least in part, from the content source using the communications link (the LSC). In other embodiments, the CAM may be configured to obtain the CAM's channel association data, at least in part, from broadcast data addressed to a subset of CAMs of which the CAM is a member.

The process described above leads to the CICAM 30 providing a CICAM NIT to the host 10 on request by the host 10.

To recap, three operator profile settings are under discussion here. These are:

profile_type=0: in this mode, the NIT is determined from the broadcast information;

profile_type=1: in this mode, the CAM delivers a NIT to the host, and the host generates a LCN list dependent upon the NIT delivered by the CAM; and profile_type=2: in this mode, the CAM delivers a NIT to the host, and the host generates a LCN list in dependence upon a composite NIT derived from a combination of the broadcast NIT and the CICAM NIT.

It will, however, be appreciated that embodiments may operate only in the mode referred to above as profile_type=2. That is to say, the option of operating in profile_type={0,1} is not essential to the present technology; instead, the system could always operate in a manner which combines any NIT information provided by the CICAM with any NIT information obtained from the broadcast signal. In this case, it would be unnecessary for the host to query the current profile_type, and indeed the variable profile_type would not be needed at all. So, the arrangements for combining the two NITs into a composite NIT (to be described below with reference to FIG. 7) are applicable whether this is the only mode of operation of the system or whether the system can operate according to the different values of profile_type discussed above.

Figure 7:
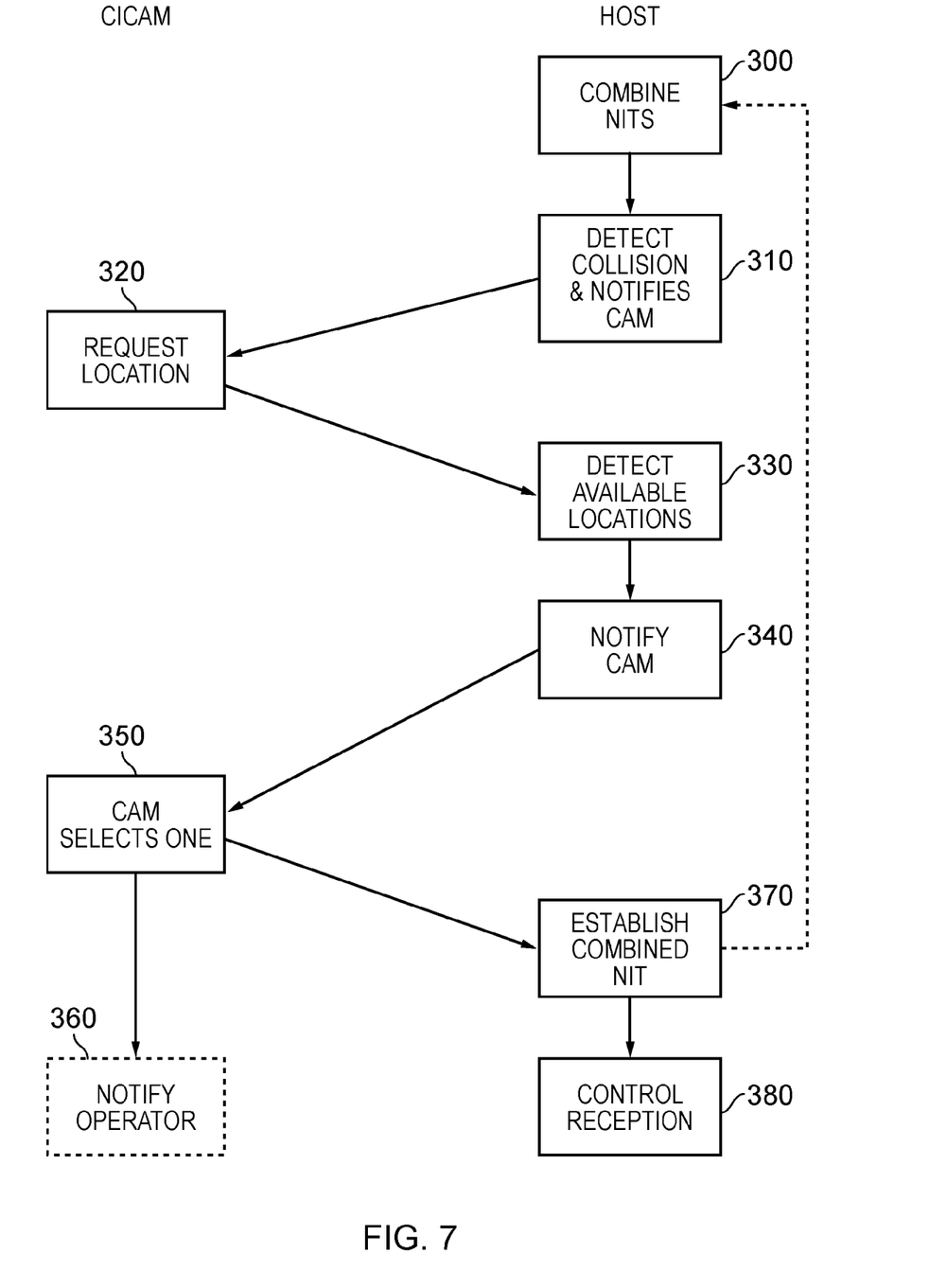
FIG. 7 schematically illustrates the combination of NITs from a CAM and from a broadcast signal.

FIG. 7 schematically illustrates the combination of NITs from a CICAM and from a broadcast signal. The process starts from the end of FIG. 6, in that the CICAM 30 has delivered a CICAM NIT to the host. It is also assumed that the host 10 has derived a broadcast NIT itself, and so has two versions of the NIT available, to be combined into the composite NIT. In general terms, the steps carried out by the host in FIG. 7 may be performed by the controller 170, and the steps carried out by the CICAM in FIG. 7 may be performed by the NIT generator 130.

Each NIT may contain various types of information, but for the purposes of the present discussion the significant information fields are: LCN, channel name and channel location (noting that, as a minimum, only the respective transport stream needs to be specified, because the PIDs for each channel within a transport stream are defined by the PAT/PMT of that transport stream). Purely as examples for use in the following discussion, and omitting any additional information other than the three fields identified above, the CICAM NIT and the broadcast NIT are shown below. The symbol "..." indicates additional data rows which are omitted for clarity of the following discussion, and the symbol " " indicates that a data field is empty or undefined. The examples refer to broadcast channels in current use (at the filing date of the present application) in the United Kingdom, but it will be appreciated that the techniques are generally applicable to other broadcast channels.

(a) Broadcast NIT:

| LCN | Channel name | Channel location |
|-----|--------------|------------------|
| 1   | BBC1         | TS-A             |
| 2   | BBC2         | TS-A             |
| ... | ...          | ...              |
| 7   | ---          | ---              |
| 8   | Channel 4    | TS-B             |
| 9   | Channel 5    | TS-B             |
| ... | ...          | ...              |
| 23  | ---          | ---              |
| 24  | ---          | ---              |
| ... | ...          | ...              |

(b) CICAM NIT:

| LCN | Channel name | Channel location |
|-----|--------------|------------------|
| 1   | BBC1         | TS-A             |
| 2   | BBC2         | TS-A             |
| ... | ...          | ...              |
| 7   | ---          | ---              |
| 8   | Operator service 1 | TS-C       |
| 9   | Channel 5    | TS-D             |
| ... | ...          | ...              |
| 23  | Operator Service 2 | TS-C       |
| 24  | ---          | ---              |
| ... | ...          | ...              |

Referring back to FIG. 7, at a step 300 the host combines, or attempts to combine, the two NITs. In the first instance, the host, at the step 300, forms a simple additive combination of the two NITs so that the information associated with each available value of LCN is included from both of the NITs to be combined.

So, referring to the examples given above, the first attempt at a composite NIT generated by the step 300 would include the following information:

(c) Composite NIT at step 300:

| LCN | Channel name | Channel location |
|-----|--------------|------------------|
| 1   | BBC1         | TS-A             |
| 2   | BBC2         | TS-A             |
| ... | ...          | ...              |
| 7   | ---          | ---              |
| 8   | Channel 4, Operator service 1 | TS-B, TS-C |
| 9   | Channel 5    | TS-B, TS-D       |
| ... | ...          | ...              |
| 23  | Operator Service 2 | TS-C       |
| 24  | ---          | ---              |
| ... | ...          | ...              |

Where the information is identical between the two NITs, that information is carried forward into the composite NIT. Where information is included only in one NIT but there is no conflict of LCN, for example in respect of the LCN 23 where only one of the NITs defines a channel at that LCN, the information from the one of the NITs which defines a channel at that LCN is used. In the case where the two NITs define different information in respect of a particular LCN, both sets of information are included by the step 300 and the conflict for collision is dealt with by the steps 310 onwards. An example of such a collision occurs in respect of LCN 8, where the two NITs define different respective services at that LCN.

In the above example, LCN 9 has the same channel name in the two NITs, but two associated TSs. In instances like this, the matter can be decided by convention. In the present example, the convention is that the Broadcast NIT takes precedence over the CICAM NIT.

As an additional variant, the host could inform the CAM of channel name locations where the channel name is the same but the TS is different. This would allow the CAM to rename a channel in the CICAM NIT to a different name, perhaps as a variant of the original name, for example by adding a single letter suffix. For example, the channel BBC2 could be renamed as BBC2W (W for Wales).

At the step 310, collisions (as defined above, where different services are defined by the two NITs in respect of the same LCN) are detected by the host, and the host notifies the CICAM of the collision, giving the CICAM at least the LCN (which may be referred to as the logical channel index) at (or on, or in respect of) which the collision has occurred. In other words, the host module comprises a detector configured to detect a conflict of logical channel index between the channel association data acquired by the host from the broadcast data path and the channel association data provided by the CAM and, in the case of a conflict, to detect one or more unused logical channel indices. If no collisions are detected at the step 310 then control can be passed directly to a step 380 to control reception.

At a step 320, the CICAM requests a new location from the host. In other words, the CICAM request a different LCN for the service originally allocated to the conflicting LCN. Note that this may occur several times within the NITs, so that in each case the collision is notified to the CICAM at this step 310 and, again in each case, the CICAM requests a new location for that channel at the step 320. Where there are multiple collisions, the notifications and requests can be dealt with in parallel or as a series of interactions between the host and the CICAM. In other words, the CAM is configured to select one of the unused logical channel indices for use by a media channel for which the logical channel index defined in the CAM's channel association data conflicts with a logical channel index defined in the host's channel association data.

At a step 330, the host consults the initial composite NIT generated at the step 300, and detects currently unused LCN values. In embodiments, the host also detects which of those currently unused LCN values are numerically closest to the (or each) LCN value at which a collision has occurred. At a step 340, the host communicates to the CICAM the LCN(s) representing available locations.

In an alternative embodiment, instead of performing the step 320, the host may combine the steps 310 and 330, so that in effect the host receives the NIT from the CAM, combines the NITs at the step 300, detects collisions and reports to the CAM the available locations. The CAM can either select one of the offered locations, or reply with a request for a different LCN, or simply set a different LCN.

In fact it is strictly necessary only to notify one available location to the CICAM in respect of each collision, because the way in which available locations are detected, from the initial attempt (c) at the composite NIT, means that a location detected by the host as available will by definition be unused within the CICAM NIT. However, to provide flexibility to the CICAM, and in particular to the operator or provider of the CICAM NIT, more than one available location can be notified to the CICAM in respect of each collision, at the step 340.

At a step 350, the CICAM selects one of the notified available locations in respect of each LCN for which there is a collision. The selection may be arbitrary (for example, the numerically lowest LCN of those offered in respect of each collision), or may be made in consultation with the operator (for example, by interaction over the LSC link 68), or may be made according to a predetermined algorithm or look-up table provided at manufacture or by a previous data communication from the operator. For example, where the logical channel indices or LCNs are numerical indices, and the CAM may be configured to select the lowest-numbered of the unused logical channel indices provided by the host. The CAM may be configured to communicate to the content source that a logical channel index of a channel defined by the CAM's channel association data has been changed in response to a conflict with the host's channel association data.

From the step 350, control passes both to an optional step 360, at which the CICAM may notify the operator of the conflict and its resolution (for example, by interaction over the LSC link 68), and to a step 370 at which the host establishes a final version of the composite NIT using the locations selected by the CICAM at the step 350 to overcome any collisions. After the step 370 control can either be passed to the step 380 to control reception, or control can be passed back to the step 300 so that any collisions are again detected.

In the present example, assume that the host offered the CICAM the LCNs 7 and 24 as alternative available locations in respect of the conflicting "Operator service 1" at LCN 8. Assume also that at the step 350, the CICAM selected the LCN 7 for that service, for example on the basis that LCN 7 was the numerically lowest of the available locations offered by the host. Therefore, at the step 370 the host establishes the final composite NIT as follows:

| (d) Final composite NIT at step 370: | | |
| --- | --- | --- |
| LCN | Channel name | Channel location |
| 1 | BBC1 | TS-A |
| 2 | BBC2 | TS-A |
| ... | ... | ... |
| 7 | Operator service 1 | TS-C |

| (d) Final composite NIT at step 370: | | |
| --- | --- | --- |
| LCN | Channel name | Channel location |
| 8 | Channel 4 | TS-B |
| 9 | Channel 5 | TS-B |
| ... | ... | ... |
| 23 | Operator Service 2 | TS-C |
| 24 | --- | --- |
| ... | ... | ... |

The host controls reception of programme material according to the final composite NIT at a step 380. This may involve displaying data such as broadcast electronic programme guide data, with associated LCNs, to allow for user selection of a channel for reproduction on the basis of the LCN.

As discussed above, if only one potential available location is communicated to the CICAM at the step 340, then the step 350 simply becomes a step of accepting the change to the conflicting LCN. Alternatively the CAM can assert a different LCN altogether for that service.

The step 320 may be omitted, or more accurately combined with the step 340, so that the CICAM is notified of the collision and of the available alternative location at a single stage.

Note that the techniques are not restricted to the combination of only two NITs; if different sources of NIT are available, they can be combined into a composite NIT using these techniques, such that any conflicts of LCN are addressed as described above.

Although the embodiments have been described in the context of broadcast over radio frequency channels such as satellite or terrestrial channels, it will be appreciated that the techniques are equally suitable to the broadcast of data by other ways, such as by an internet protocol (IP) broadcast system or via a cable distribution system. In each case, the term "tuner" applies to a part of the system which selects one transport stream rather than another, even if that selection process does not involve a radio frequency tuning operation.

If the host is in fact capable of handling two services on the same LCN, it need not inform the CAM of a collision and can instead ask the user to select one of the two variants of the service for a particular LCN.

Embodiments also include a data signal, being a signal within the apparatus as described, in particular (though not exclusively) a signal as passed from the host to the CAM or set of CAMs, or the return signal. A storage medium such as a memory by which such a signal is stored is also considered as an embodiment of the present disclosure. The storage medium may be, for example, a non-transitory machine-readable storage medium.

Embodiments of the disclosure also include: an audio/video content receiver being configured to receive media content from a content source by a broadcast data path, the media content being arranged as a plurality of media channels, the content receiver comprising:

a host module having a tuner configured to assign logical channel indices to the media channels to allow selection, at the host module, of one or more of the media channels for reproduction by selecting the corresponding logical channel index, the host module storing channel association data associating the logical channel indices with the received media channels;

a removable conditional access module (CAM), the CAM having an access control unit for decoding access-controlled encoded broadcast content, the host module and the removable CAM being arranged to provide an encrypted communication link for decoded access-controlled encoded broadcast content between the conditional access module and the host module;

in which:

the host module is configured to acquire channel association data via the broadcast data path;

the CAM is configured to provide further channel association data to the host module;

the host module comprises a detector configured to detect a conflict of logical channel index between the channel association data acquired by the host from the broadcast data path and the channel association data provided by the CAM and, in the case of a conflict, to provide to the CAM information representing the logical channel index on which the conflict has occurred.

Embodiments of the disclosure also provide a CAM operable to receive information representing the logical channel index on which the conflict has occurred.

Embodiments of the disclosure also include an audio/video content receiver being configured to receive media content from a content source by a broadcast data path, the media content being arranged as a plurality of media channels, the content receiver comprising:

a host module having a tuner configured to assign logical channel indices to the media channels to allow selection, at the host module, of one or more of the media channels for reproduction by selecting the corresponding logical channel index, the host module storing channel association data associating the logical channel indices with the received media channels;

a removable conditional access module (CAM), the CAM having an access control unit for decoding access-controlled encoded broadcast content, the host module and the removable CAM being arranged to provide an encrypted communication link for decoded access-controlled encoded broadcast content between the conditional access module and the host module;

in which:

the host module is configured to acquire channel association data via the broadcast data path;

the CAM is configured to provide further channel association data to the host module;

the host module comprises a detector configured to detect a conflict of logical channel index between the channel association data acquired by the host from the broadcast data path and the channel association data provided by the CAM and, in the case of a conflict, to detect one or more unused logical channel indices which are numerically closest to the logical channel index on which the conflict has occurred.

Embodiments of the disclosure provide CAM configured to receive one or more unused logical channel indices which are numerically closest to the logical channel index on which the conflict has occurred.

More generally, it will be appreciated that where a technical feature of an embodiment is described here in respect of one item communicating certain data to another item, both the data-sending and the data-receiving items in this communication are considered as respective embodiments of the present disclosure.

Insofar as embodiments have been implemented, at least in part, using the software-controlled data processing apparatus, it will be appreciated that such software, and a medium by which the software is provisioned (such as a non-transitory machine-readable storage medium, for example a magnetic or optical disc or a non-volatile memory) are also considered as embodiments of the present disclosure.

It will be apparent that numerous modifications and variations of the present disclosure are possible in light of the above teachings. It is therefore to be understood that within the scope of the appended claims, the technology may be practised otherwise than as specifically described herein.

The invention claimed is:

1. An audio/video content receiver being configured to receive media content from a content source by a broadcast data path, the media content being arranged as a plurality of media channels, the content receiver comprising:

host circuitry having a tuner configured to assign logical channel indices to the media channels to allow selection, at the host circuitry, of one or more of the media channels for reproduction by selecting the corresponding logical channel index, the host circuitry storing channel association data associating the logical channel indices with the received media channels; and removable conditional access circuitry configured to decode access-controlled encoded broadcast content, the host circuitry and the removable conditional access circuitry being arranged to provide an encrypted communication link for decoded access-controlled encoded broadcast content between the removable conditional access circuitry and the host circuitry, wherein the host circuitry is configured to acquire channel association data via the broadcast data path;

the removable conditional access circuitry is configured to provide further channel association data to the host circuitry;

the host circuitry comprises a detector configured to detect a conflict of logical channel index between the channel association data acquired by the host circuitry from the broadcast data path and the channel association data provided by the removable conditional access circuitry and, in the case of a conflict, to detect one or more unused logical channel indices; and the removable conditional access circuitry is configured to select one of the unused logical channel indices for use by a media channel for which the logical channel index defined in the removable conditional access circuitry's channel association data conflicts with a logical channel index defined in the host circuitry's channel association data.

2. The receiver according to claim 1, wherein the logical channel indices are numerical indices, and the removable conditional access circuitry is configured to select the lowest-numbered of the unused logical channel indices provided by the host circuitry.

3. The receiver according to claim 1, wherein the removable conditional access circuitry and the content source are configured to establish a secure communications link via an internet data connection.

4. The receiver according to claim 3, wherein the removable conditional access circuitry is configured to communicate to the content source that a logical channel index of a channel defined by the removable conditional access circuitry's channel association data has been changed in response to a conflict with the host circuitry's channel association data.

5. The receiver according to claim 3, wherein the removable conditional access circuitry is configured to obtain the removable conditional access circuitry's channel association data, at least in part, from the content source using the communications link.

6. The receiver according to claim 1, wherein the removable conditional access circuitry is configured to obtain the removable conditional access circuitry's channel association data, at least in part, from broadcast data addressed to a subset of removable conditional access circuitry of which the removable conditional access circuitry is a member.

7. The receiver according to claim 1, wherein the host circuitry and the removable conditional access circuitry are arranged to provide an encrypted communication link for decoded access-controlled encoded broadcast content between the removable conditional access circuitry and the host circuitry.

8. The receiver according to claim 1, wherein the content source is configured to send data to the host circuitry as one or more of: internet protocol (IP) data, satellite broadcast data, terrestrial television broadcast data and cable broadcast data.

9. The receiver according to claim 1, wherein the removable conditional access circuitry is removable conditional access circuitry according to the Common Interface plus standard.

10. The receiver according to claim 1, wherein the channel association data comprises a network information table (NIT).

11. The receiver according to claim 1, wherein the receiver is configured to display a channel selection list to allow user selection of a channel according to the logical channel index associated with that channel.

12. The receiver according to claim 1, wherein the host circuitry is configured, in the case of a conflict, to provide to the removable conditional access circuitry information representing the logical channel index at which a conflict has occurred.

13. The receiver according to claim 1, wherein the host circuitry is configured, in the case of a conflict, to detect one or more unused logical channel indices which are numerically closest to the logical channel index at which a conflict has occurred.

14. The receiver according to claim 1, wherein the host circuitry establishes a final version of the channel association data using the one of the unused logical channel indices as selected by the removable conditional access circuitry to overcome the conflict.

15. An audio/video content reception method for receiving media content from a content source by a broadcast data path by a receiver having a host circuitry and removable conditional access circuitry, the removable conditional access circuitry being configured to decode access-controlled encoded broadcast content, the host circuitry and the removable conditional access circuitry being arranged to provide an encrypted communication link for decoded access-controlled encoded broadcast content between the removable conditional access circuitry and the host circuitry, the media content being arranged as a plurality of media channels, the method comprising:
  the host circuitry assigning logical channel indices to the media channels to allow selection, at the host circuitry, of one or more of the media channels for reproduction by selecting the corresponding logical channel index;
  the host circuitry storing channel association data associating the logical channel indices with the received media channels;
  the host circuitry acquiring channel association data via the broadcast data path;
  the removable conditional access circuitry providing further channel association data to the circuitry;
  the host circuitry detecting a conflict of logical channel index between the channel association data acquired by the host from the broadcast data path and the channel association data provided by the removable conditional access circuitry and, in the case of a conflict, detecting one or more unused logical channel indices; and the removable conditional access circuitry selecting one of the unused logical channel indices for use by a media channel for which the logical channel index defined in the removable conditional access circuitry's channel association data conflicts with a logical channel index defined in the host circuitry's channel association data.

16. An apparatus comprising:
removable conditional access circuitry for use in an audio/video content receiver being configured to receive media content from a content source by a broadcast data path, the media content being arranged as a plurality of media channels, the content receiver comprising host circuitry having a tuner configured to assign logical channel indices to the media channels to allow selection, at the host circuitry, of one or more of the media channels for reproduction by selecting the corresponding logical channel index, the host circuitry storing channel association data associating the logical channel indices with the received media channels, the host circuitry being configured to acquire channel association data via the broadcast data path;
the removable conditional access circuitry being configured to decode access-controlled encoded broadcast content, the host circuitry and the removable conditional access circuitry being arranged to provide an encrypted communication link for decoded access-controlled encoded broadcast content between the removable conditional access circuitry and the host circuitry, wherein
the removable conditional access circuitry is configured to provide further channel association data to the host circuitry;
in response to the detection of a conflict of logical channel index between the channel association data acquired by the host from the broadcast data path and the channel association data provided by the removable conditional access circuitry and a detection, by the host circuitry, of one or more unused logical channel indices, the removable conditional access circuitry is configured to select one of the unused logical channel indices for use by a media channel for which the logical channel index defined in the removable conditional access circuitry's channel association data conflicts with a logical channel index defined in the host circuitry's channel association data.

17. A method of operation of removable conditional access circuitry for use in an audio/video content receiver being configured to receive media content from a content source by a broadcast data path, the media content being arranged as a plurality of media channels, the content receiver comprising host circuitry having a tuner configured to assign logical channel indices to the media channels to allow selection, at the host circuitry, of one or more of the media channels for reproduction by selecting the corresponding logical channel index, the host circuitry storing channel association data associating the logical channel indices with the received media channels, the host circuitry being configured to acquire channel association data via the broadcast data path;
  the removable conditional access circuitry being configured to decode access-controlled encoded broadcast content, the host circuitry and the removable conditional access circuitry being arranged to provide an encrypted communication link for decoded access-controlled encoded broadcast content between the removable conditional access circuitry and the host circuitry;

the method comprising:

providing further channel association data to the host circuitry; and in response to the detection of a conflict of logical channel index between the channel association data acquired by the host from the broadcast data path and the channel association data provided by the removable conditional access circuitry and a detection, by the host circuitry, of one or more unused logical channel indices, selecting one of the unused logical channel indices for use by a media channel for which the logical channel index defined in the removable conditional access circuitry's channel association data conflicts with a logical channel index defined in the host circuitry's channel association data.

18. An apparatus comprising:

host circuitry for use in an audio/video content receiver being configured to receive media content from a content source by a broadcast data path, the media content being arranged as a plurality of media channels, the host circuitry having a tuner configured to assign logical channel indices to the media channels to allow selection, at the host circuitry, of one or more of the media channels for reproduction by selecting the corresponding logical channel index, the host circuitry storing channel association data associating the logical channel indices with the received media channels and being connectable to removable conditional access circuitry, the removable conditional access circuitry being configured to decode access-controlled encoded broadcast content, the host circuitry and the removable conditional access circuitry being arranged to provide an encrypted communication link for decoded access-controlled encoded broadcast content between the removable conditional access circuitry and the host circuitry, wherein the host circuitry is configured to acquire channel association data via the broadcast data path and to receive further channel association data from the removable conditional access circuitry; and the host circuitry comprises a detector configured to detect a conflict of logical channel index between the channel association data acquired by the host circuitry from the broadcast data path and the channel association data provided by the removable conditional access circuitry and, in the case of a conflict, to detect one or more unused logical channel indices for selection by the removable conditional access circuitry for use by a media channel for which the logical channel index defined in the removable conditional access circuitry's channel association data conflicts with a logical channel index defined in the host circuitry's channel association data.

19. A method of operation of host circuitry in an audio/video content receiver being configured to receive media content from a content source by a broadcast data path, the media content being arranged as a plurality of media channels, the host circuitry having a tuner configured to assign logical channel indices to the media channels to allow selection, at the host circuitry, of one or more of the media channels for reproduction by selecting the corresponding logical channel index, the host circuitry storing channel association data associating the logical channel indices with the received media channels and being connectable to removable conditional access circuitry, the removable conditional access circuitry being configured to decode access-controlled encoded broadcast content, the host circuitry and the removable conditional access circuitry being arranged to provide an encrypted communication link for decoded access-controlled encoded broadcast content between the removable conditional access circuitry and the host circuitry;

the method comprising:

acquiring channel association data via the broadcast data path and to receive further channel association data from the removable conditional access circuitry; and detecting, using the host circuitry, a conflict of logical channel index between the channel association data acquired by the host circuitry from the broadcast data path and the channel association data provided by the removable conditional access circuitry and, in the case of a conflict, to detect one or more unused logical channel indices for selection by the removable conditional access circuitry for use by a media channel for which the logical channel index defined in the removable conditional access circuitry's channel association data conflicts with a logical channel index defined in the host circuitry's channel association data.

20. A non-transitory computer readable medium including computer program instructions, which when executed by a computer cause the computer to perform the method of claim 15.

* * * * *